United States Patent [19]
Haslam et al.

[11] Patent Number: 5,590,953
[45] Date of Patent: Jan. 7, 1997

[54] DIRECTABLE DECORATIVE LANTERN WITH MOTION SENSOR

[75] Inventors: Gary M. Haslam, Graham; Simeon T. Lee, Burlington, both of N.C.

[73] Assignee: Regent Lighting Corporation, Burlington, N.C.

[21] Appl. No.: 430,199

[22] Filed: Apr. 27, 1995

[51] Int. Cl.⁶ .................................................. F21V 23/00
[52] U.S. Cl. .......................... 362/276; 362/394; 362/147; 362/287; 362/802
[58] Field of Search ................................... 362/394, 276, 362/147, 287, 802

[56] References Cited

U.S. PATENT DOCUMENTS

| | | | |
|---|---|---|---|
| D. 315,424 | 3/1991 | Claytor | D26/122 |
| 2,709,224 | 5/1955 | Garnick . | |
| 3,958,118 | 5/1976 | Schwarz | 250/221 |
| 3,988,726 | 10/1976 | Reiss et al. | 340/258 D |
| 4,787,722 | 11/1988 | Claytor | 350/452 |
| 5,243,508 | 9/1993 | Ewing et al. | 362/431 |
| 5,282,118 | 1/1994 | Lee | 362/276 |
| 5,308,985 | 5/1994 | Lee | 250/353 |
| 5,434,764 | 7/1995 | Lee et al. | 362/276 |
| 5,442,532 | 8/1995 | Boulos et al. | 362/276 |

OTHER PUBLICATIONS

Advertisement "Automatic Two Level Lighting", about Jun. 1994.
Advertisement "Motion Activated 300 Watt Quartz Halogen Floodlight", about Jun. 1992.
Advertisement "Motion Activated Twin Floodlight Kit", about Dec. 1993.

Primary Examiner—Denise L. Gromada
Assistant Examiner—Alfred Basichas
Attorney, Agent, or Firm—Olive & Olive, P.A.

[57] ABSTRACT

A motion activated decorative lantern having an optical lens which becomes part of the lantern structure and appearance so that there is no profile difference due to the presence of the motion sensor. The detection range area may be adjusted without the details of the adjustment being visible. A rotatable sensing module has an integral appearance with that of the fixture. The decorative lantern has a decorative lamp portion and a mounting portion, a cylindrical sensing module having a chamber; a motion sensor located in the chamber for detecting motion in a selected location around the lantern; and a lens piece positioned around the sensing module and over the chamber. The lens piece has a uniform decorative appearance. The sensing module is rotatable to change the selected location of detection of the lantern. The lantern also includes a decorative external housing, decorative tail below the sensing module and a decorative lantern base. An internal housing for housing electronic components of the lantern is positioned within the external housing above a chamber in which the motion sensor is located.

20 Claims, 7 Drawing Sheets

DIRECTABLE DECORATIVE LANTERN WITH MOTION SENSOR

BACKGROUND OF THE INVENTION

1. Field of the Invention

This invention relates to motion activated lights.

2. Description of the Related Art

Decorative outdoor lanterns for residential and commercial lighting applications have been popular for many years. In the past six years or so, motion sensors have been added to such lanterns to provide more convenience, energy savings, and security for the user. Passive infrared (PIR) sensors have been developed and utilized in various such lanterns to sense the approach or motion of a person. The light fixtures turn on when someone moves into the sensor's field of view, and then automatically turn off when the motion ceases.

Infrared radiation is the physical means of detection of such fixtures, there being a known relationship between the wavelength of the strongest infrared radiation and the temperature of the body emitting it. Thus, the body of a human, as well as that of some other animals, radiates the strongest infrared radiation between 9 μm and 10 μm. Infrared radiation can be detected due to the "pyroelectric effect", which is due to the generation of a surface electric charge on certain dielectric crystalline materials when exposed to infrared radiation, which differs from the "natural charge" at thermal equilibrium that is present due to spontaneous polarization. The current which flows when there is a temperature change and resultant change in surface charge can be measured by means known in the art, for example, by connecting a high impedance resistor between the electrodes of both crystal surfaces and reading the voltage drop.

An improvement in infrared detection devices occurred when the optical system was developed to include a number of facets in an associated reflector and/or one or more lenses, which were oriented so that radiation originating in the particular ranges of angular scan of the lenses was sequentially directed to a group of thermal detectors (See for example, U.S. Pat. No. 3,958,118 of Schwartz).

Motion activated light fixtures now generally utilize infrared sensors, together with an optical collecting and focusing means such as a system of Fresnel lenses. The aggregate of the individual fields of view of the multiple Fresnel lenses defines the overall field of view of the device. Generally, the lens plates to which the Fresnel lenses are mounted are curved sections from a cylindrical surface, with the Fresnel lenses being mounted in parallel rows. Examples include various fixtures sold by Regent Lighting Corporation (e.g., Model Numbers MS35, MS30 and MS80). Fresnel lenses, each of which is made of a surface of a series of concentric circular prisms, collect radiation from a moving object and direct the energy to a detector. The detector can be a thermistor in which resistance changes with a change in the energy level, or more generally, a pyrosensor which generates a voltage or alters a current passing through it. Such fixtures also comprise one or more signal amplifiers and a control circuit.

Early lantern designs housed the motion detectors D in a large backplate that the decorative fixture was attached to, as shown in FIG. 1. Such motion detectors were visible and clearly affected the decorative appearance of the fixture. Also, they often meant that certain decorative features of the fixture had to be removed or altered, for example, the lower tail present on many fixtures would obscure the field of view of the sensor.

Other lanterns have been designed with the motion detector D located in a clearly visible window in the base of the fixture itself as shown in FIGS. 2 and 3. See also, U.S. Pat. No. 5,282,118 of Lee. In these cases, although the decorative appearance is less affected than by the earlier models, someone viewing the lantern can still tell that the lantern is a motion sensing lantern because the window that is necessary for the lens of the motion sensor is clearly distinguishable from the surrounding fixture material, even if the lens shape and color more closely blends with the lantern than in prior fixtures.

State-of-the-art motion detectors that claim to have "hidden" sensors generally utilize a modular construction because the small portion of the lamp where the sensor is located is not large enough to hold all of the electrical components. One part of the motion detector circuitry is connected to the remainder of the circuit by a connector cable threaded through the lantern fixture.

It is therefore an object of this invention to provide a motion activated decorative lantern which has a optical lens which becomes part of the lantern structure and appearance so that there is no profile difference due to the presence of the motion sensor, and which has no external cables other than power connections.

Prior motion detecting lanterns which may be adjusted so that the area viewed by the lantern changes have been made. Generally, this adjustment involved turning the base of the lantern so that the visible window rotates and is aimed in the area of detection. In these fixtures the direction of aiming is also visible to those the owner wishes to detect.

It is therefore a further object of the invention to provide a motion activated decorative lantern which allows adjustment in the detection area without the details of the adjustment being visible when the lantern is viewed.

Other objects and advantages will be more fully apparent from the following disclosure and appended claims.

SUMMARY OF THE INVENTION

The invention provides a motion-activated decorative lantern having an optical lens which becomes part of the lantern structure and appearance so that there is no profile difference due to the presence of the motion sensor. In the lantern of the invention the detection range area may be adjusted without the details of the adjustment being visible.

The motion-activated decorative lantern has a decorative lamp portion and a mounting portion as are known in the art. The lantern further includes a cylindrical sensing module having a chamber; a motion sensor located in the chamber for detecting motion in a selected location around the lantern; and a lens piece positioned around the entire module and over the chamber, the lens piece having a uniform decorative appearance; wherein the sensing module is rotatable to change the selected location of detection which location of detection is not detectable by a person within the location.

To complete the decorative appearance of the lantern of the invention it also preferably includes a decorative external housing, decorative tail below the sensing module and a decorative lantern base. An internal housing for housing electronic components of the lantern is positioned within the external housing above a chamber in which the motion sensor is located.

Other aspects and features of the invention will be more fully apparent from the following disclosure and appended claims.

DETAILED DESCRIPTION OF THE INVENTION AND PREFERRED EMBODIMENTS THEREOF

Figure 15:
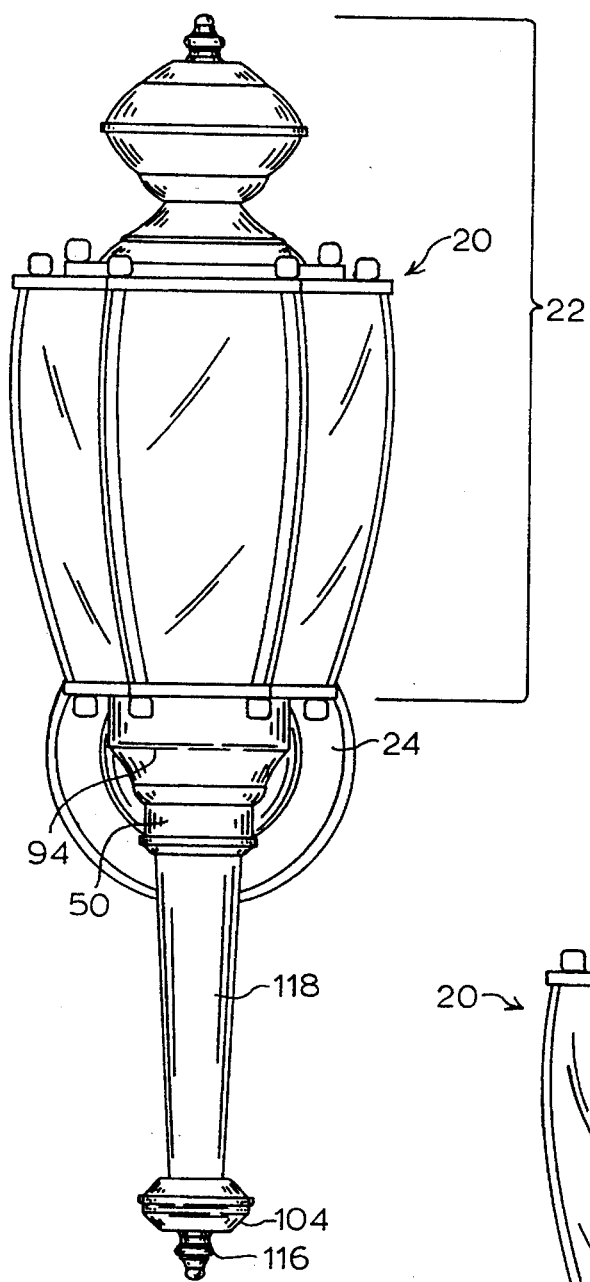
FIG. 15 is a front perspective view of a lantern having the motion sensing module according to the invention, and having an extended decorative tail.
Figure 16:
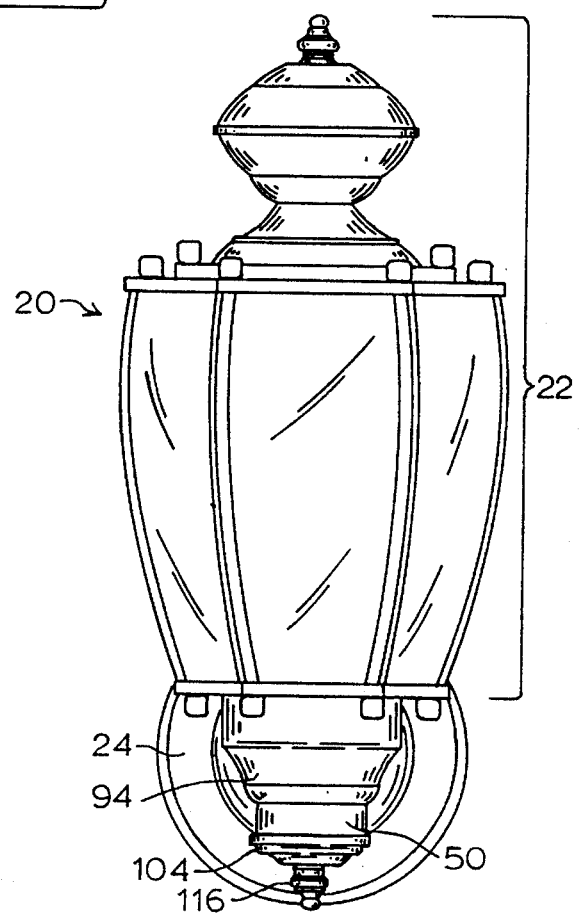
FIG. 16 is a front perspective view of a lantern according to FIG. 15 but having a short decorative tail.

The decorative lantern 20 of which the invention is a part includes a decorative lamp portion 22 and a mounting portion 24 for mounting a decorative lantern to a wall or other surface. Both the decorative lamp portion and the mounting portion may be any as are known in the art. Although it is preferred that the components of the invention be attached to the decorative lantern below the decorative lamp portion 22, other locations as are preferred in a particular design of lantern may be used. Examples of completely assembled lanterns according to the invention are shown in FIGS. 15–16.

Figure 1:
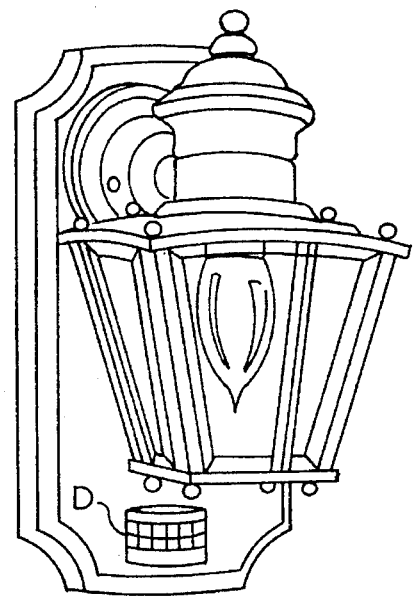
FIGS. 1–3 are perspective views of prior art motion activated decorative lanterns.
Figure 3:
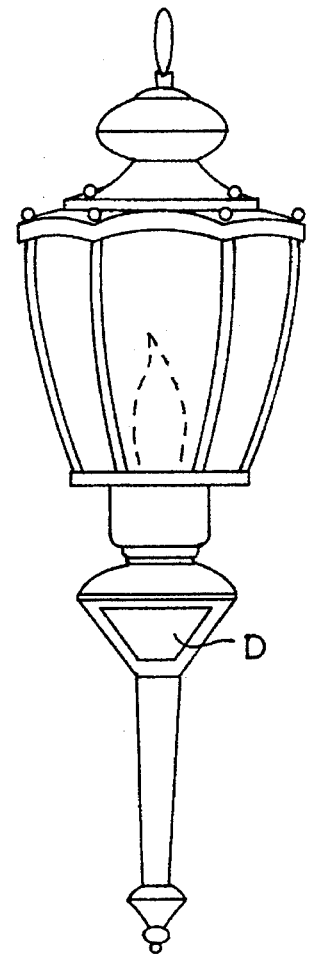
Figure 2:
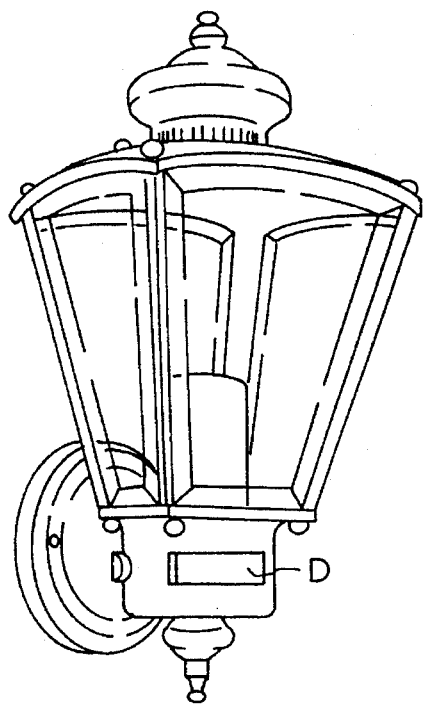
Figure 4:
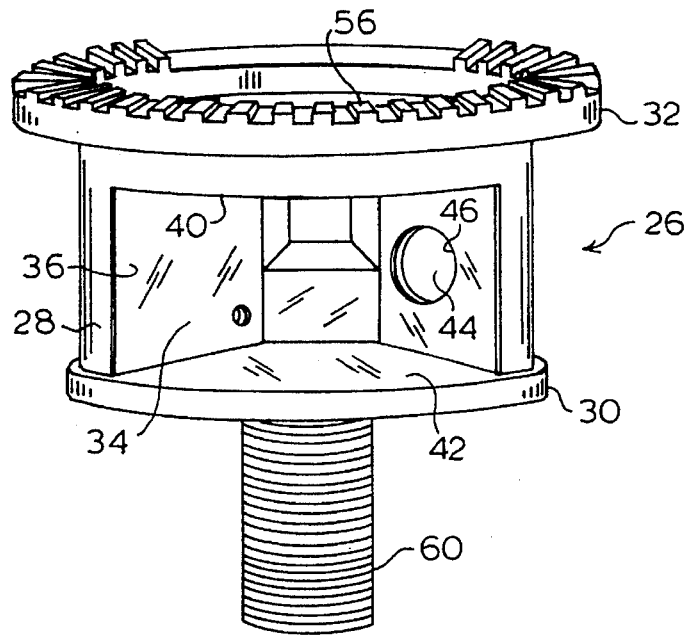
FIG. 4 is a front perspective view of a sensing module according to the invention.

A decorative lantern 20 which is activated by motion according to the invention, comprises in addition to the standard decorative lamp portion 22 and mounting portion 24, a generally cylindrical sensing module 26 (FIG. 4) as the principal component of the invention. The cylindrical portion 28 has a bottom wall 30 and a top flange 32 and forms the body of the sensing module. On the side of the cylindrical portion 28 of the sensing module 26 is a chamber 34. The chamber has angled side walls 36 on each side of a hole in the back of the chamber, behind which hole is positioned a motion sensor 38 for detecting motion in a selected location around the lantern 20. The side walls 36 and the top and bottom walls 40,42 of the chamber are preferably metallized, for example, by covering with metallized film or by vacuum metallizing, to increase the infrared sensing capacity of the motion sensor 38.

In the preferred embodiment of the invention shown in the figures, a photocell 44 as is known in the art is positioned behind a hole 46 in one of the side walls 36 of the chamber 34. In situations where lighting is low, the photocell may be positioned in the bottom wall 30 of the sensing module with additional holes added in the various components which cover the bottom wall to allow the photocell to detect external light.

Figure 6:
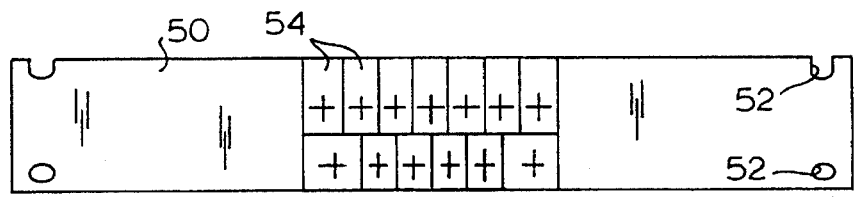
FIG. 6 is a plan view of a lens according to the invention.

One or more staking posts 48 extend outward from the side of the cylindrical portion 28 opposite the chamber 34. A rectangular lens piece 50 (FIG. 6) having a width essentially equivalent to the height of the cylindrical portion 28, a length slightly greater than the circumference of the cylindrical portion, and holes 52 located in a position corresponding to the location of the staking posts 48, is attached to the wall of the cylindrical portion 28 so that it covers the chamber 34. The lens piece 50 may be permanently affixed to the cylindrical portion 28 by hot melting the ends together after the holes 52 in the lens piece 50 are placed over the staking posts 48. Alternatively, the ends of staking posts 48 are hot-staked as is known in the art of plastics assembly to hold the lens piece 50 in position.

Lens piece 50 has a uniform decorative appearance so that when the sensing module is rotated to change the selected location of detection, the orientation of the lens and the resultant field of view are not detectable by a person who is within the location of detection. Preferably the rectangular lens is tinted so that it is difficult or impossible to see through the lens when the lens is mounted on the cylinder. Lens piece 50 may be any desired color. Brass color, black and white are particularly useful with fixture colors now used. At the portion of the lens mounted over the chamber, Fresnel lenses 54 as known in the art are positioned. The alignment and positioning of the Fresnel lenses 54 are determined by the desired area of view of the lens. During manufacture, the position of each lens segment on lens plate is determined by means known in the art so that infrared radiation from a desired area is directed at that lens segment when mounted on the lens and will be focused by the particular lens segment so that it is detected by the detector. Although with very close inspection of the lens an observer can determine the location of the lens segments and thus, the direction of view of the fixture, the location of the lens segments and the chamber behind the lens is not otherwise visible. Thus, a person coming into the detection zone of the fixture would be detected by the fixture long before he was able to ascertain that the fixture was "aimed" in his direction. Furthermore, because the motion sensor does not protrude from the fixture, and because the lens does not break the surface of the fixture, but is integral with it, it is difficult to see, particularly from a distance, that the fixture is a motion-detecting fixture at all.

Figure 5:
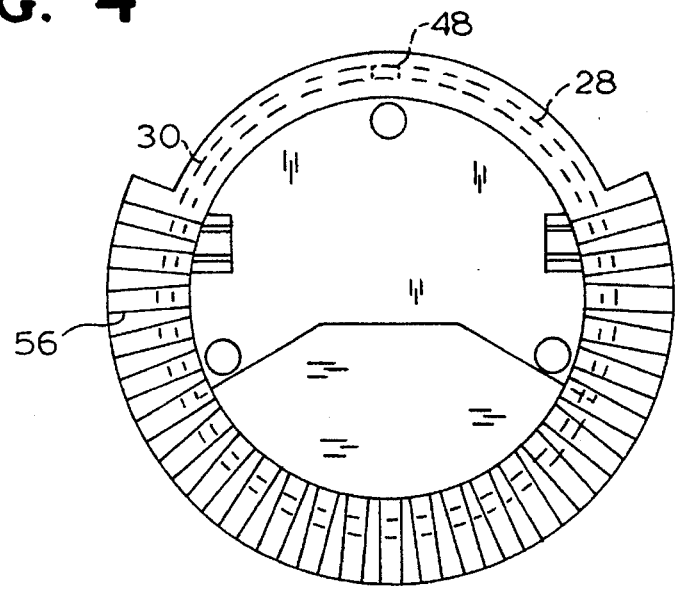
FIG. 5 is a top plan view of the sensing module of FIG. 4.

The top flange 32 of the sensing module has a plurality of ridges 56 which are aligned radially along the flange 32, and extend upward, preferably along the entire upper surface of the flange 32 to offer the tactile sense of locking the turret into the desired position (FIG. 5). The top flange 32 forms a generally semicircular rim, having a greater diameter than that of the cylindrical portion 28, and which extends outward around more than half of the circumference of the top of the cylindrical portion 28. The means of movement of the sensing module 26 is discussed below along with the discussion of the internal housing.

The bottom wall 30 of cylindrical portion 28 extends across the bottom of the cylindrical portion 28. There are drain holes 58 in the bottom wall 30 should water accidentally get into the fixture. A threaded stem 60 protrudes downward from the center of the bottom wall 30, for attachment of the decorative fixture tail.

The sensing module 26, as well as the internal housing 64, are preferably made of a moldable plastic so that the desired complex shapes can be attained and so that there is electrical insulation between the circuit boards and the preferably metallic outer housing.

The sensing module 26 is mounted at the bottom of an internal housing 64 (which is in turn inserted within a decorative lamp portion 22). The internal housing 64 houses the majority of electronic components of the light fixture, and is preferably molded of two mating parts, termed herein back housing 66 (FIG. 9) and front housing 68 (FIGS. 7–8), each of which has an upper layer 62 covering it. The back housing 66 and the front housing 68 are held together by a screw driven into boss 70, or by other means, as are known in the art.

Front and back housing 66,68 each have a lower groove 72 (FIGS. 7–9), in which the flange 32 of sensing module 26 fits and may be rotated. The extent of rotation is limited by placement of a stop 74 within the housing, shown as being in the groove on back housing 66 in FIG. 9. This asymmetry also serves to make sure the sensor faces forward (away from the mounting surface). The groove 72 of the front housing 68 also preferably has an interference detent 76 (FIG. 7) against which the ridges 56 of the flange 32 abut in turn as the sensing module 26 is rotated in the groove 72 of the assembled internal housing 64. Because the ridges 56 can, with a small amount of force, be rotated past the interference detent 76, the sensing module 26 can be rotated into any position between the positions defined by the location of the detent and the ends of the top flange 32. The rotation of the sensing module 26 is in incremental steps as the ridges are moved past the interference detent 76. One or the other of the ends of flange 32 come to rest against the stop 74 when the sensing module 26 is rotated as far as it will go in each direction, In assembly, the sensing module 26 may be placed in the groove 72 of one of the housing pieces, and the housing pieces then are abutted against each other to enclose the upper portion of the sensing module 26. For the preferred method of attachment of the housing pieces, the sides of one of the housing pieces (shown as the front housing in the figures) have a depression 78 in which there is a cylindrical boss 70 with a central interior bore 80 extending part way into the boss 70 (FIG. 8). At an opposing position on the other housing piece (shown as the back housing in FIG. 9) is a depression 82 having a traversing perpendicular wall 84 extending along the edge of the housing piece, and having a hole 86 therein which is aligned with the bore 80 in the boss 70 when the housing pieces are assembled together. Any other method of attachment, for example, ultrasonic welding or gluing, may be used to hold the front and back housing together.

Figure 7:
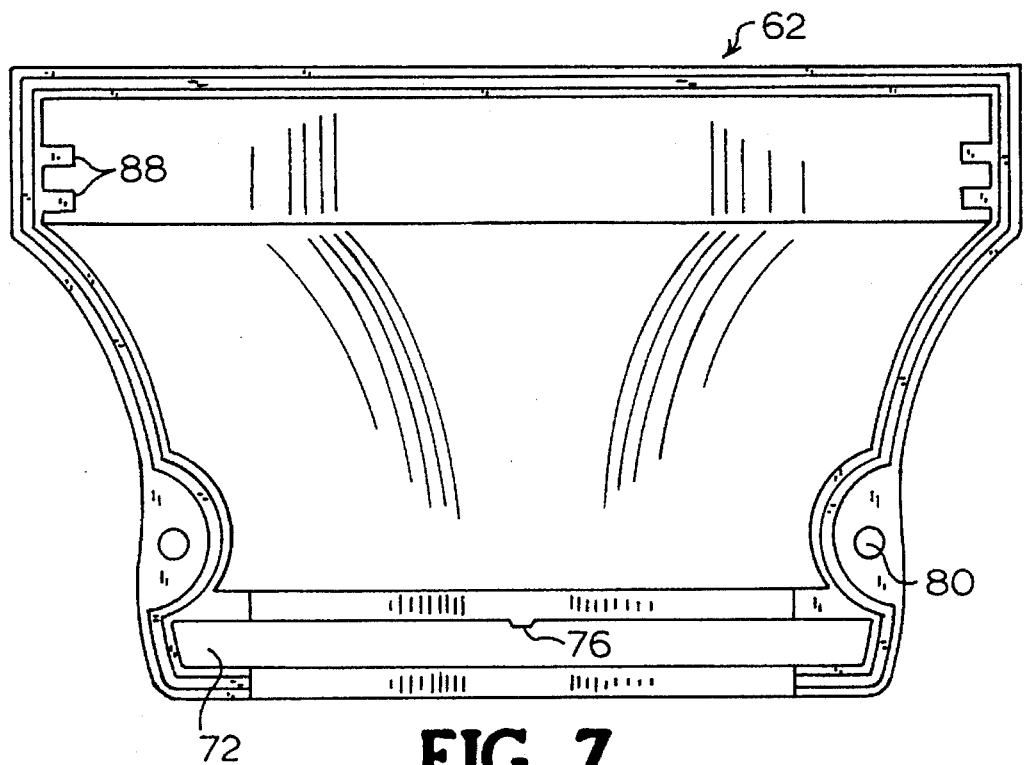
FIG. 7 is an internal elevational view of a front interior housing according to the invention.
Figure 8:
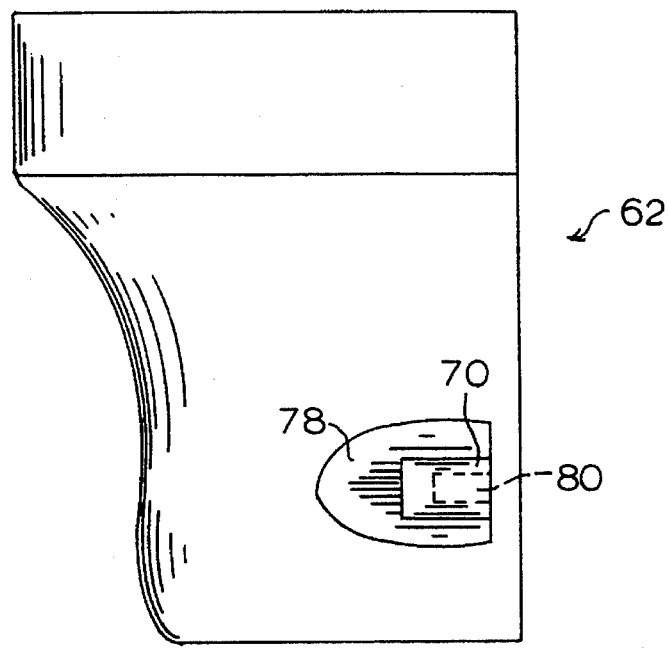
FIG. 8 is a side elevational view of the front interior housing.
Figure 9:
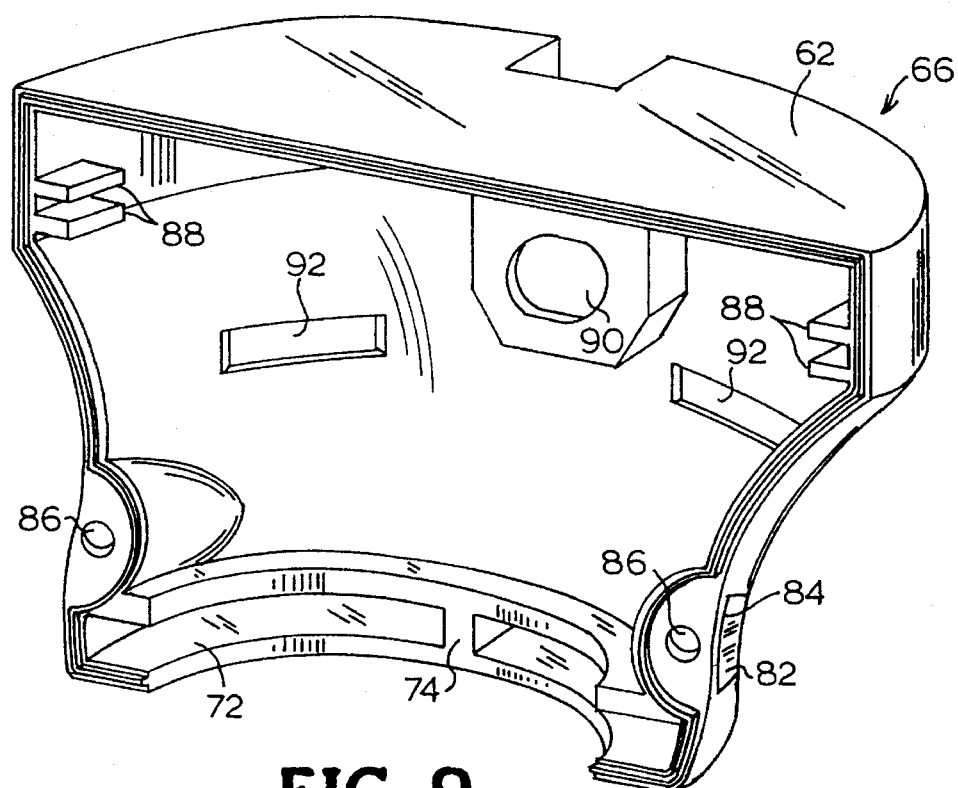
FIG. 9 is an internal elevational view of a back interior housing according to the invention.

At the top of front housing and rear housing are one or more pairs of interior horizontal flanges 88 (FIGS. 7–9). These flanges 88 are used to hold one or more circuit boards or other electronic components (not shown) within the internal housing 64 above the sensing module 26, and connected to the circuitry within the sensing module 26. Connection of this circuitry to circuitry in the backplate mounting portion 24 is through a rear port 90 extending out the back of the back housing 66.

The switches (not shown) for adjusting the performance (range or sensitivity and timing) of motion sensor 38 are located within the internal housing 64 so that they are just within switch openings 92 located on the back housing 66 (FIG. 9).

Figure 13:
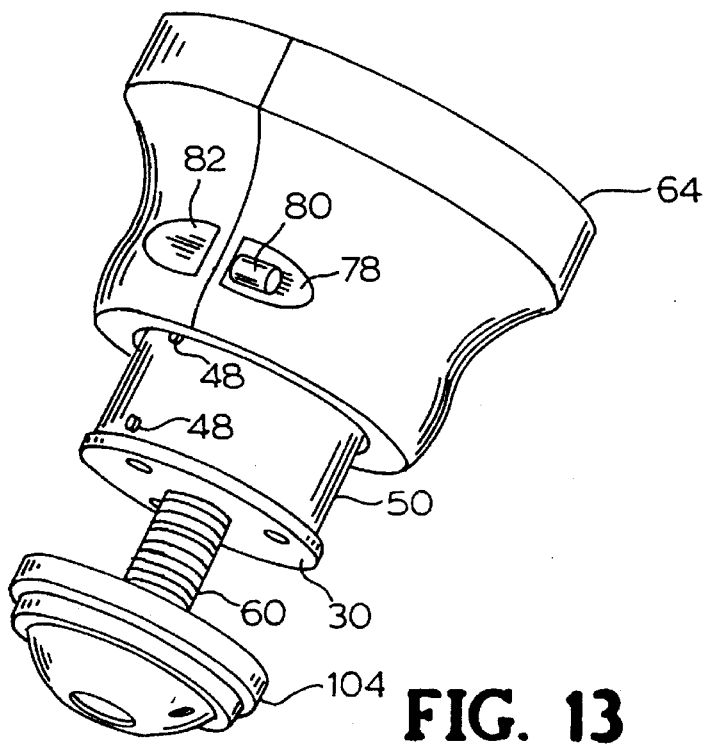
FIG. 13 is a perspective view of the assembled motion sensor module without the decorative external housing, and with the decorative lantern base part positioned below the sensing module prior to adding the base part to the fixture.

FIG. 13 shows the assembled internal housing 64 and sensing module 26, with a decorative lantern base (discussed below) positioned below the threaded stem 60 over which it is placed in the embodiment of the invention having a short decorative tail 116 (FIG. 16).

Figure 10:
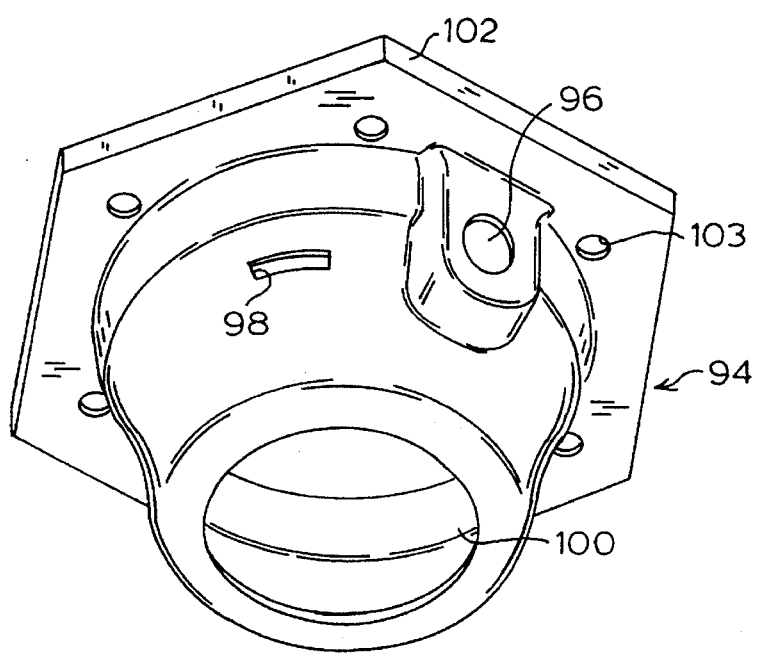
FIG. 10 is a lower side perspective view of a decorative external housing according to the invention.

Connected to the lower side of a selected decorative lamp portion 22 is a decorative external housing 94 according to the invention (FIG. 10). Decorative external housing is preferably made of brass or other decorative material and is coordinated in color and overall-appearance and design with the decorative lamp portion, mounting portion and decorative tail of the lantern.

Decorative external housing 94 surrounds the assembled internal housing 64 and is aligned with the internal housing 64 so that port 90 is aligned with a rear port 96 in the external housing 94, and so that the switch openings in the inner housing 92 are aligned with switch openings 98 in external housing 94. Most or all of the cylindrical portion 28 of the sensing module 26 extends through an opening 100 in the lower side of external housing 94 so that the lens piece 50 and the threaded stem 60 extend below the external housing 94 when the lantern 20 is assembled.

An upper flange 102 on external housing 94 has a perimeter with a shape mountable on, and preferably corresponding to, the shape of the lower edge of the decorative lamp portion 22. For example, an external housing 94 having a hexagonal upper flange (shown in FIG. 10) is preferably used for a decorative body portion having a hexagonal lower edge. Other shapes as are desired for a particular decorative fixture may be used, for example, square, round, ellipsoidal, and the like. Mounting holes 103 in upper flange 102 are used to attach external housing 94 to decorative lamp portion 22.

Figure 14:
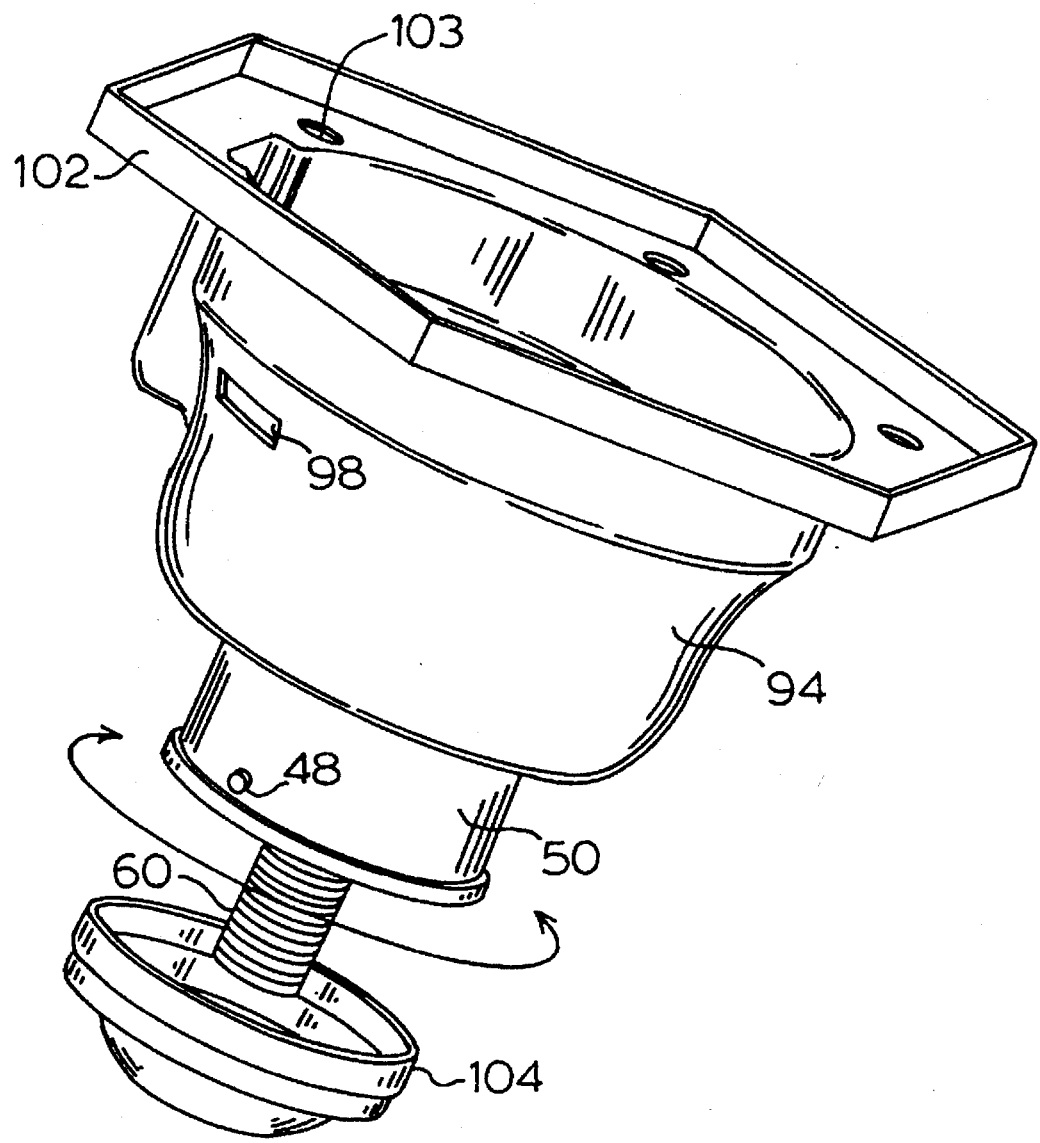
FIG. 14 is a perspective view of an assembled motion sensor module having the decorative external housing, with an arrow showing how the sensing module may be turned.

FIG. 14 shows the assembled external housing 94 and sensing module 26, with a decorative lantern base (discussed below) positioned below the threaded stem 60 over which it is positioned in the embodiment of the invention having a short decorative tail 116.

Figure 12:
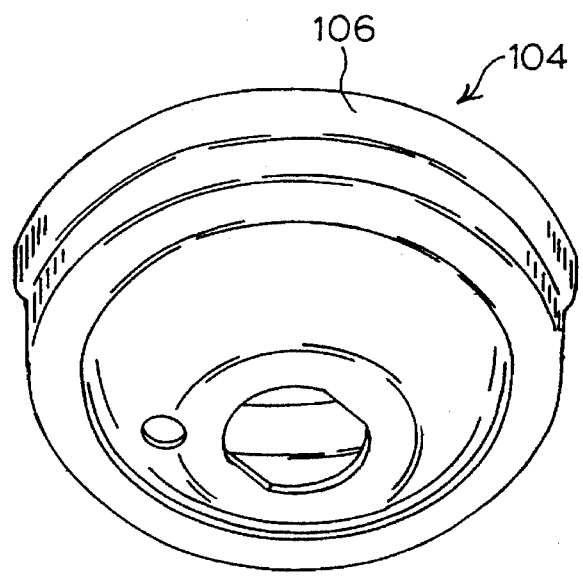
FIG. 12 is a lower perspective view of a decorative lantern base part.

Decorative lantern base 104 (FIG. 12) is assembled below sensing module 26. An important feature of the invention is that it accommodates lantern styles with and without decorative tails. Decorative lantern base 104 is preferably made of the same brass or other metal as is the external housing. In the embodiment of the invention having only a decorative knob and no decorative tail (FIG. 16), upper rim 106 of decorative lantern base fits over the outer edge of bottom wall 30 of sensing module 26 once sensing module 26 and internal housing 64 are assembled together with external housing 94.

Decorative tail 116, formed to have an appearance as is known in the art or as is desired for the particular fixture, is threaded on to threaded stem 60. For example, for the short decorative tail 116 shown in FIG. 16, a knobbed piece is attached so that it is entirely below decorative lantern base 104. For an elongated tail as shown in FIG. 15, there may be an extension 118 attached to the lower edge of the sensing module 26, with the decorative lantern base 104 and knob piece below the extension 118.

Figure 11:
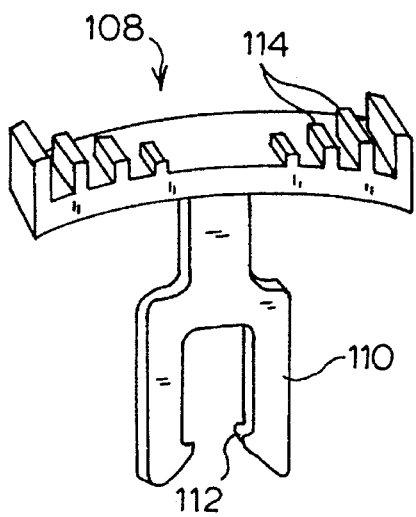
FIG. 11 is a side perspective view of a switch cover according the invention.

Once the lantern 20 is assembled, a switch cover 108 is inserted into each switch opening 92,98 on the lantern (FIG. 11). Switch grasping mechanism 110 slips over a switch and is firmly, but removably held there by inward facing protrusion 112. A plurality of ridges 114 on each switch cover 108 allows the user to move the switch cover 108 within the opening which causes movement of the switch grasping mechanism 110 resulting in changing the switch position. Preferably the ridges 114 are higher and wider at the outside edges of the switch cover and become shorter and lower toward the center of the switch cover, where there may be no ridges, as shown in FIG. 11.

As an example of switch positions, the "time-on" switch may be changeable from fully on to various dimming positions. As an example of three possible preset switch positions for the time, in a first position, the light fixture turns on to dim when it is dark outside, and becomes bright for a set period of time when motion is detected (for example, 4 minutes); in a second position the fixture is also be dim when it is dark but stays on for a longer time period after motion is detected (for example, 12 minutes); and in a third position, the fixture is entirely off until motion is detected and then is on (for example, for 4 minutes). The various switch positions for the detection range of the motion sensor may be set so that the fixture could be set for low, medium and high sensitivity to motion in the detection field.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A decorative lantern having a decorative lamp portion and a mounting portion, and which is activated by motion, comprising:

(a) a cylindrical sensing module having a chamber;
   (b) a motion sensor located in the chamber for detecting motion in a selected location around the lantern; and
   (c) a lens piece positioned around the module and over the chamber, the lens piece having a uniform decorative appearance and extending all around the cylindrical sensing module; wherein the sensing module is rotatable to change the selected location of detection, which location of detection is not detectable by a person within the location.

2. The decorative lantern of claim 1, further comprising a photocell.

3. The decorative lantern of claim 2, wherein the photocell is located in the chamber.

4. The decorative lantern of claim 1, further comprising an internal housing positioned above the chamber for housing electronic components of the lantern.

5. The decorative lantern of claim 4, wherein the internal housing has at least one switch hole positioned over a switch located within the internal housing.

6. The decorative lantern of claim 5, further comprising a switch cover for externally adjusting position of the switch.

7. The decorative lantern of claim 6, further comprising a decorative external housing having a switch hole aligned with each at least one switch hole on the internal housing.

8. The decorative lantern of claim 1, further comprising an internal housing positioned above the chamber for housing electronic components of the lantern, a decorative external housing positioned around the internal housing, and decorative lantern base positioned below the sensing module.

9. The decorative lantern of claim 8, further comprising a decorative tail below the sensing module.

10. The decorative lantern of claim 1, wherein the sensing module has an upper ridged flange extending partially around the sensing module, and further comprising an internal housing having a lower groove in which the flange is mounted, the lower groove having a detent against rotation of the flange is stopped, and having a stop for retarding free rotation of the flange.

11. The decorative lantern of claim 1, wherein the lens piece is formed in a rectangular shape.

12. The decorative lantern of claim 1, further comprising a threaded stem extending from a bottom wall of the sensing module, to enable attachment of one or more decorative portions below the sensing module.

13. In a decorative lantern which is activated by motion, the improvement comprising:

(a) a cylindrical sensing module having a chamber;
   (b) a motion sensor located in said chamber for detecting motion in a selectable location around said lantern; and
   (c) a lens piece positioned around said module and over said chamber, said lens piece having a uniform decorative appearance and extending all around the module; wherein said sensing module is rotatable to change the selected location of detection, which selected location of detection is not detectable by a person within said location.

14. The decorative lantern of claim 13, further comprising a photocell located in the chamber.

15. The decorative lantern of claim 13, further comprising an internal housing positioned above the chamber for housing electronic components of the lantern, wherein the internal housing has at least one switch hole positioned over a switch located within the internal housing.

16. The decorative lantern of claim 15, further comprising a switch cover for externally adjusting position of the switch.

17. The decorative lantern of claim 15, further comprising a decorative external housing having a switch hole aligned with each at least one switch hole on the internal housing.

18. The decorative lantern of claim 13, further comprising an internal housing positioned above the chamber for housing electronic components of the lantern, a decorative external housing positioned around the internal housing, and decorative lantern base positioned below the sensing module.

19. The decorative lantern of claim 13, wherein the sensing module has an upper ridged flange extending partially around the sensing module, and further comprising an internal housing having a lower groove in which the flange is mounted, the lower groove having a detent against rotation of the flange is stopped, and having a stop for retarding free rotation of the flange.

20. The decorative lantern of claim 13, further comprising a threaded stem extending from a bottom wall of the sensing module, to enable attachment of one or more decorative portions below the sensing module.

* * * * *